United States Patent [19]

Hänni et al.

[11] Patent Number: 4,474,094
[45] Date of Patent: Oct. 2, 1984

[54] APPARATUS FOR OUTFEEDING AND STACKING OF SHEET METAL SECTIONS OR CUTTINGS OR THE LIKE

[75] Inventors: Eduard Hänni, Zofingen; Walter Gygli, Niederbipp, both of Switzerland

[73] Assignee: Hämmerle AG Maschinenfabrik, Zofingen, Switzerland

[21] Appl. No.: 461,934

[22] Filed: Jan. 28, 1983

[30] Foreign Application Priority Data

Feb. 4, 1982 [CH] Switzerland ............... 680/82

[51] Int. Cl.³ ............................................. B21D 43/22
[52] U.S. Cl. ........................................ 83/104; 83/157
[58] Field of Search ............... 83/104, 111, 112, 109, 83/151, 153, 154, 157

[56] References Cited

U.S. PATENT DOCUMENTS

| | | | |
|---|---|---|---|
| 3,670,611 | 6/1972 | Jarman | 83/104 X |
| 3,830,121 | 8/1974 | Makeev et al. | 83/104 X |
| 3,866,498 | 2/1975 | Jarman | 83/104 X |
| 4,040,318 | 8/1977 | Makeev et al. | 83/104 X |
| 4,407,628 | 10/1983 | Pearson et al. | 83/104 X |

Primary Examiner—Donald R. Schran
Attorney, Agent, or Firm—Werner W. Kleeman

[57] ABSTRACT

The apparatus forms upon a pallet an orderly arrangement of stacks of sheet metal sections or cuttings at predetermined places with the aid of supporting rake means and abutment means following sheet metal shears. Scrap metal cuttings obtained by trimming or at the end of a sheet metal plate are received by a separate waste scrap metal collecting means positioned beneath a sheet metal feeding or infeed table and movable below the sheet metal shears. The sheet metal sections or cuttings are caught and entrained by automatically controlled catching means, such as an entrainment bracket, disposed at the supporting rake means, so as to be able to be moved horizontally in order that large accelerations and velocities can be achieved during the stacking of the sheet metal sections or cuttings.

8 Claims, 7 Drawing Figures

4,474,094

APPARATUS FOR OUTFEEDING AND STACKING OF SHEET METAL SECTIONS OR CUTTINGS OR THE LIKE

BACKGROUND OF THE INVENTION

The present invention relates to a new and improved apparatus for outfeeding and stacking sheet metal sections or cuttings or the like which are formed following a sheet metal feeding or infeed table associated with sheet metal shears or cutter means.

In its more particular aspects the apparatus of the present development is of the type comprising a cutting blade or cutter, supporting rake or grate means for receiving the sheet metal sections or cuttings, abutment or stop means structured to be horizontally displaceable relative to said supporting rake means in accordance with the desired width of the sheet metal section or cutting, and a roller platform designed to be vertically adjustable and serving to carry pallets or containers which receive stacks of said sheet metal sections or cuttings. For stacking the sheet metal sections or cuttings—sometimes referred to as blanks—deposited on the supporting rake means immediately after the cutting operation, the supporting rake means including the abutment means are arranged to be selectively positioned above one of a number of stacking locations during a first step of a horizontal movement and, for releasing the sheet metal section or cutting, the supporting rake means can be displaced beyond said stacking location during a second step of said horizontal movement in the same direction.

Sheet metal shears or shear arrangements as known, for example, from German Patent Publication No. 2,840,668, comprise stacking means arranged at the rear side of the cutting blade or cutter. The stacking means serve to selectively stack the cut-off sheet metal strips at different places in such a manner that different stacks can be served, which are arranged, for example, in the order of the size of the sheet metal strips, or such that in the case of constant strip size a number of equal stacks can be served immediately one after the other for better space utilization. The cut-off sheet metal strip is placed upon a supporting grid or grate following the cutting location and is pushed onto a chain conveyor by means of pushing or pusher arms extending between the parallel rods of the supporting grid. The sheet metal strips are conveyed to supporting rake means structured to be moved horizontally across the stacking surface by means of cams mounted on the chains of the chain conveyor. The supporting rake means is accelerated from a rest position to the speed of the chain conveyor shortly prior to the time that the trailing edge of the sheet metal section leaves the chain conveyor. The supporting rake means is retracted together with the sheet metal section towards an abutment or stop. To gently decelerate the sheet metal strip the abutment is accelerated to the speed of the sheet metal strip on the supporting rake means prior to being contacted by the leading edge of the sheet metal strip and is, then, decelerated until it comes to a standstill. Approximately at the point of transition from the acceleration phase to the deceleration phase the sheet metal edge contacts the abutment and the sheet metal strip is gently decelerated to standstill together with the abutment while the supporting rake means moves further at a constant speed and the sheet metal strip falls onto the intended stack. The drop or fall height is maintained approximately constant by means of a vertically adjustable roller platform upon which, for example, there rests a pallet for receiving the sheet metal strips.

It is a disadvantage of this design that the stacking means must work with small accelerations and small velocities in order to prevent the sheet metal sections from sliding upon the supporting rake means and to neatly stack the same. A further disadvantage is the relatively large space required for the stacking means including the supporting grid, the chain conveyor and the supporting rake means which are arranged following the cutting plane. It is additionally a drawback of this system design that scrap sheet metal obtained during trimming the sheet metal plates indiscriminately falls onto the floor between the cutting plane and the supporting grid and must be manually removed in a troublesome and cumbersome operation.

SUMMARY OF THE INVENTION

Therefore, with the foregoing in mind it is a primary object of the present invention to provide an improved construction of apparatus for outfeeding and stacking of sheet metal sections or cuttings which is designed to faultlessly operate at very high accelerations and velocities.

Another and more specific object of the present invention aims at the provision of a new and improved apparatus of the aforementioned type which has only very modest space requirements.

Still a further significant object of the present invention is directed to a new and improved construction of an apparatus for outfeeding and stacking of sheet metal sections or cuttings which includes means for collecting waste or scrap sheet metal.

A further significant object of the present invention is directed to a new and improved construction of an apparatus for outfeeding and stacking of sheet metal sections or cuttings which, despite the prevailing high working accelerations and velocities, enables performance of a distinct orderly stacking of the sheet metal sections or cuttings.

Now in order to implement these and still further objects of the invention, which will become more readily apparent as the description proceeds, the apparatus of the present development is manifested by the features that the support or supporting rake means is arranged for vertical movement together with the cutter or cutting blade, and there is provided an entrainment or catching means on the cutting blade side of the supporting rake means. The entrainment or catching means comprises an entrainment bracket which includes a finger rotationally journalled at the supporting rake means; A displaceable actuator comprising an actuating cam is arranged below a sheet metal infeed or feeding table and reciprocates between a rest position and an actuating position. The actuator in its actuating position acts upon the finger of the entrainment bracket in order to rotate the same into a catching or entrainment position in which the finger projects beyond the surface of the supporting rake means, when the supporting rake means is advanced towards the sheet metal infeed table. Further provided are means to accelerate and to decelerate the supporting rake means when executing the movement steps in order to effect displacement of the sheet metal sections or cuttings resting thereon, and scrap metal collecting means for collecting waste or scrap metal cuttings formed during the cutting operation.

The advantages achieved by the invention are essentially that the possible high accelerations and velocities available for stacking the sheet metal sections or cuttings permit optimal utilization of electronically controlled sheet shears or cutters, particularly since not only the sheet metal sections or cuttings intended for further processing are stacked, but also since the scrap sheet metal obtained during trimming the sheet metal plates and the residual waste or scrap sheet metal remaining for each sheet metal plate at the end of the cutting operation are collected in separate waste or scrap metal collecting means. By omitting both the feeding means arranged to follow the cutting blade, namely the supporting grid including the pushing arms and the chain conveyor, the overall length of the stacking means or device is reduced, on the one hand, and furthermore, time is saved due to the shorter travel paths which are present during stacking the sheet metal sections or cuttings, on the other hand.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
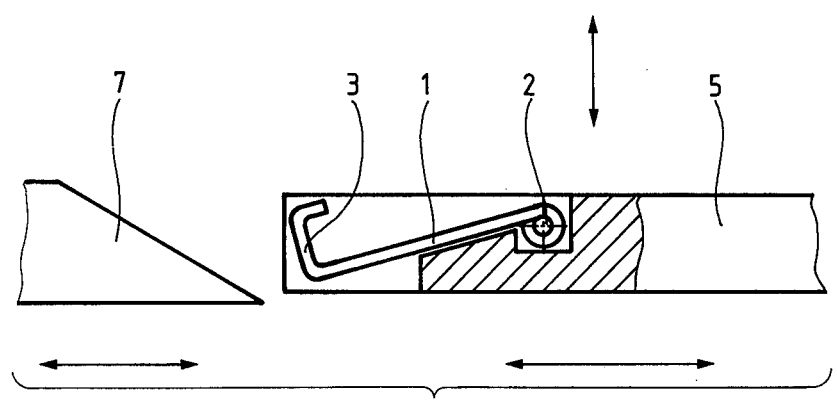
FIG. 1 shows a section through the support rake or supporting rake means at the region of the entrainment or catching means here depicted in the form of an entrainment bracket which is shown in its rest position and used in the outfeeding and stacking apparatus according to the invention.
Figure 2:
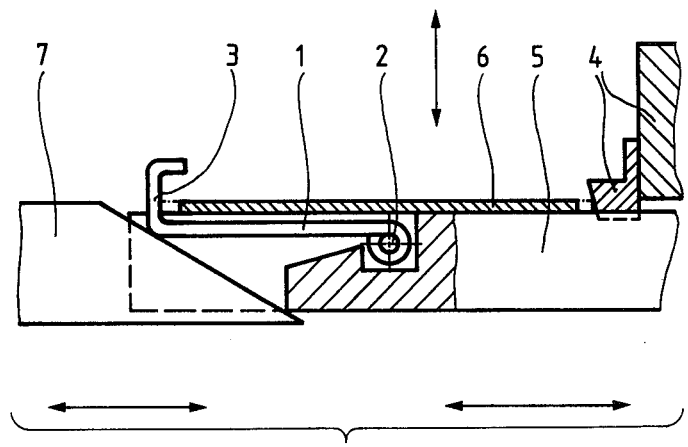
FIG. 2 shows a section through the support rake or supporting rake means at the region of the entrainment or catching means which here have been shown lifted into their working position.

Describing now the drawings, it is to be understood that in order to simplify the illustration thereof only enough of the construction of the apparatus for outfeeding and stacking of sheet metal sections or cuttings, as mentioned also referred to as blanks, has been shown as needed for those skilled in the art to readily understand the underlying principles and concepts of the invention. Furthermore, analogous or identical components depicted in FIGS. 1 through 7 have been conveniently designated with the same reference characters. Turning now specifically to FIGS. 1 and 2 there are shown entrainment or catching means in the form of an entrainment bracket 1 which is journalled at a pivot 2 or the like at a support or supporting rake means 5. The end 3 of the entrainment or catching bracket 1 adjacent a cutter or cutting blade 27 is bent into a substantially U-shaped configuration. Furthermore, an abutment or stop means 4, a sheet metal section or cutting 6, and an actuator or actuator element 7 containing a curved or ramp-like actuating face will be evident from FIGS. 1 and 2.

Figure 3:
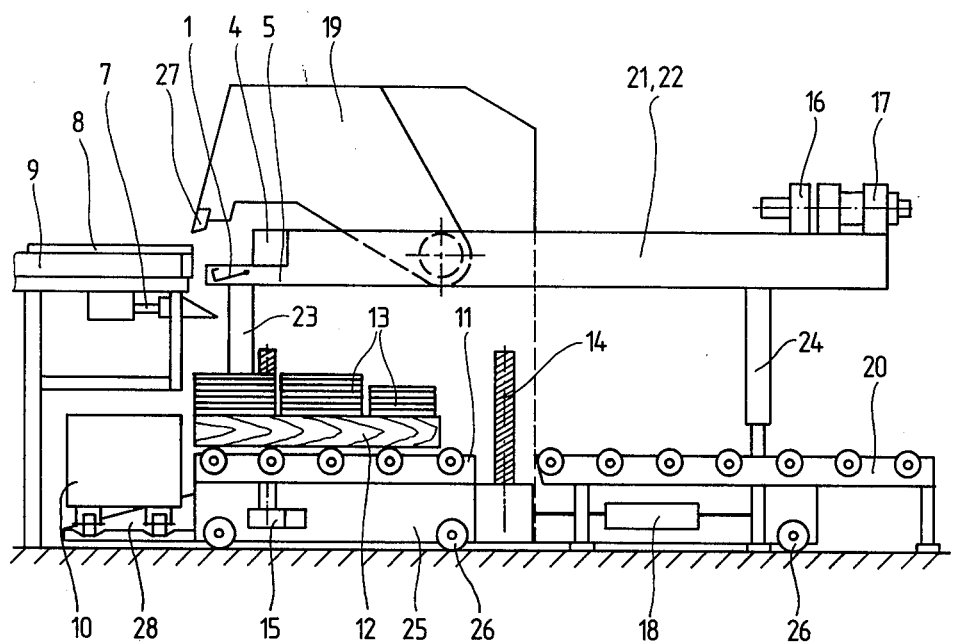
FIG. 3 is a longitudinal sectional view through a sheet shear or cutter arrangement including a stacking means or device mounted thereat and shown in the stacking position thereof.
Figure 4:
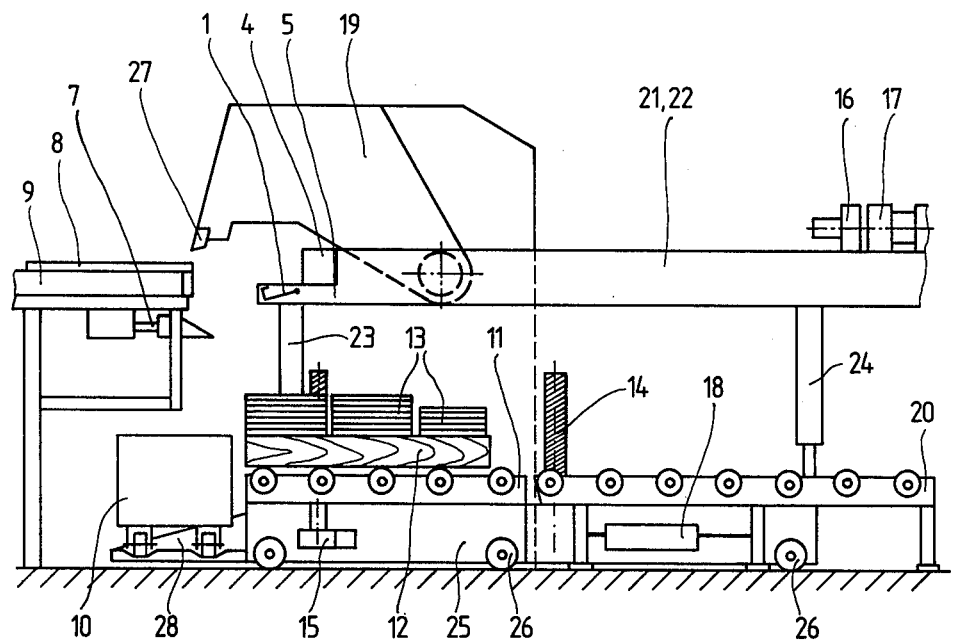
FIG. 4 is a longitudinal section through the sheet shear or cutter arrangement including the stacking means mounted thereat, as shown in FIG. 3, but this time shown in the scrap or waste cutting position.

In FIGS. 3 and 4 a sheet metal infeed or feeding table 9 feeds sheet metal plates or stock 8 to the cutting blade 27 of a cutter beam or bar 19 of a sheet shear or cutter arrangement for cutting of such sheet metal plates 8 into predetermined sheet sections or cuttings 6 by means of conventional electronically controlled and pre-programmed sheet advancing or feed means (not shown). The support or supporting rake means 5 is designed as a mobile carriage or carrier for receiving the sheet metal sections or cuttings 6 and such carriage is appropriately movably guided at the support and guide beams 21 and 22 arranged in straddling fashion adjacent the cutter beam or bar 19 on the left-hand side and on the right-hand side, respectively, thereof. Suitable drive means 17 are provided for reciprocating the support rakes or grate arrangement 5. Within the same beams 21 and 22 abutment or stop means 4 are appropriately guided and which also forms a mobile carriage which is movable independently of the support or supporting rake means 5 by the action of a suitable drive means 16 and serves to precisely position the severed sheet metal sections or cuttings 6.

The entrainment or catching bracket 1 shown in FIGS. 1 and 2 on an enlarged scale is arranged at the end of the supporting rake means 5 at the side of the cutter or cutting blade 27. The actuator or actuator element 7 containing the ramp-like actuating face for actuating the entrainment or catching bracket 1 is arranged beneath the sheet metal infeed or feeding table 9, and a scrap metal collecting means forming a container 10 serving to collect the waste or scrap sheet metal is also placed below the sheet metal infeed or feeding table 9. A roll or roller platform 11 is incrementally or stepwise vertically adjustable by means of four spindles 14 or equivalent structure driven by a suitable drive means 15. Consequently, the drop or fall height of the sheet metal sections or cuttings 13 to be stacked always can be maintained approximately the same. The roller platform 11 together with the two beams 21 and 22, along with the abutment or stop means 4 and the supporting rake means 5, are placed upon a common stacking frame 25. The roller platform 11 can be longitudinally reciprocated over a limited path of travel by means of a hydraulic cylinder 18 or equivalent structure.

A support or supporting structure 28 for supporting the waste or scrap metal container 10 is arranged at the end of the stacking frame 25 at the side of the cutter or cutting blade 27. For executing the cutting or shearing movement each of the two beams 21 and 22 is vertically displaceably connected to the longitudinally displaceable stacking frame 25 by means of a single-acting drive cylinder 24 and of a differential drive cylinder 23. For stacking the sheet metal sections or cuttings 13, for example, a pallet 12 or some other appropriate stacking facility is placed upon the roller platform 11. The roller platform 11 is followed by a fixedly installed parking roller track 20 or the like serving as a transfer station for a fork lifter or as an infeed device for some suitable conveying means (not shown).

Figure 5:
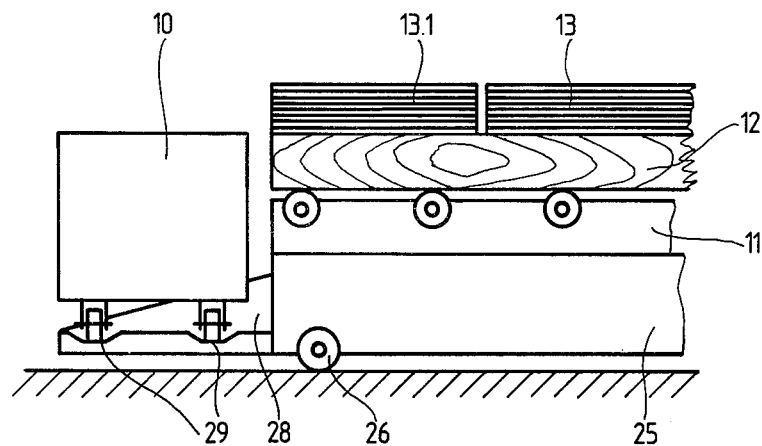
FIG. 5 illustrates an arrangement of a mobile waste or scrap metal container placed upon a supporting or support structure in a stacking frame displaceable in the stacking direction and employed in the apparatus shown in FIG. 3.

As will be evident from the showing of FIG. 5, the movable scrap metal container 10 is pushed transversely relative to the stacking direction onto the supporting structure 28 by means of guide rails 29. A first sheet metal stack 13.1 and the remaining sheet metal stacks 13 are placed on the pallet 12 located on the roll or roller platform 11. The roller platform 11 and the supporting structure 28 are carried by the stacking frame 25 which includes travel rollers 26 for the displacement thereof in the stacking direction.

Figure 6:
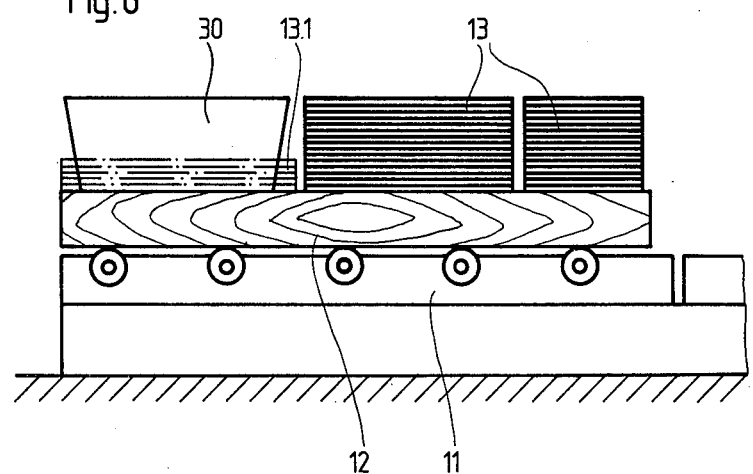
FIG. 6 shows a modification of the arrangement depicted in FIG. 5 in which a waste or scrap metal container of especially small height is placed upon a pallet receiving the sheet metal stacks.

In FIG. 6 a waste or scrap metal container 30 of especially small height is placed upon the pallet 12 and here assumes the position of the first sheet metal stack 13.1. The pallet 12 is arranged in stacking position upon the roller platform 11.

Figure 7:
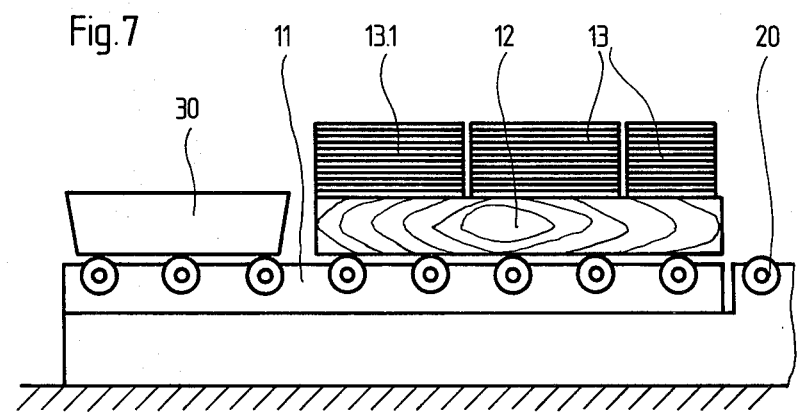
FIG. 7 depicts a still a further modification of the arrangement shown in FIG. 5 in which a waste or scrap metal container of especially small height is placed upon a roller platform in front of the pallet.

In the arrangement of FIG. 7 the waste or scrap metal container 30 of particularly small height is placed in front of the pallet 12 upon the roller platform 11. The stationary parking roller track following the roller platform 11 is here likewise designated by reference numeral 20; as before, the sheet metal stacks are designated by reference numerals 13.1 and 13.

The apparatus for outfeeding and stacking of sheet metal sections or cuttings or the like as described hereinbefore operates as follows:

For performing the shearing or cutting work, the sheet metal plates 8 are suitably supplied to the cutter or cutting blade 27 of the cutter beam or bar 19 while located upon the sheet metal infeed or feeding table 9 by means of conventional electronically controlled and pre-programmed sheet advancing or feed means. Prior to cutting a sheet metal strip as intended for further processing, the edges of the sheet metal plate 8 are initially trimmed in most cases. Therefore, the depicted sheet shear or cutter arrangement is positioned in the waste or scrap metal cutting position shown in FIG. 4. To achieve that position the common stacking frame 25 including the two beams 21 and 22 in which travel the carriages of the abutment or stop means 4 and the supporting rake means 5, the vertically adjustable roller platform 11 and the supporting structure 28 receiving the scrap metal container 10, are retracted towards the rear by about 200 mm by means of the hydraulic cylinder 18. During the trimming work, therefore, the cuts or waste trimmings emanating from the sheet metal form waste or scrap metal pieces which fall directly into the scrap metal container 10 positioned below the cutter or cutting blade 27 between the sheet metal feeding table 9 and the retracted stacking means or device.

When the first sheet metal strip is supplied, the movable stacking frame 25 is displaced back into the stacking position shown in FIG. 3. During cutting or sectionalizing the infed sheet metal strip 8 to size the two lateral beams 21, 22 resting on the hydraulic cylinders or drive units 23 and 24 and therewith the abutment or stop means 4 and the supporting rake means 5 are lowered together with the cutter or cutting blade 27. The entrainment or catching bracket 1 and the actuator element 7 including the curved actuating face associated therewith are not yet used for forming the first stack 13.1 at the side of the cutting blade 27. The cut sheet metal section is received on the supporting rake means 5 intermediate the cutting blade 27 and the predeterminedly positioned abutment or stop means 4. The supporting rake means 5 now move instantaneously rearwardly beneath the abutment or stop means 4. The sheet metal section or blank thus is prevented, by the action of the abutment or stop means 5, from moving rearwardly, and hence, falls onto the predetermined stacking location on the pallet 12 which has been placed into the correct vertical position upon the roller platform 11. For all the following stacks the actuator element 7 including the ramp-like actuating face is moved simultaneously along with the cut sheet metal section or blank towards the entrainment or catching bracket 1 or the like in the stacking direction beyond the cutting blade 27. The U-shaped end 3 of the entrainment or catching bracket 1 then projects over the top edge of the supporting rake means 5 into the working position shown in FIG. 2. Again, the cut sheet metal strip or section is received by the supporting rake means 5, and the sheared or cut edges of the sheet metal strip face the abutment means 4 on one side thereof and the entrainment or catching bracket 1 on the other side thereof.

During the following horizontal movement the supporting rake means 5 including the cut sheet metal strip or section and the abutment or stop means 4 are accelerated to a maximum acceleration of, for instance, about 7 meters per square second. At first, the cut metal strip or section slides upon the supporting rake means 5 until the trailing sheet metal strip edge contacts the hook-like end 3 formed at the entrainment or catching bracket 1. Meanwhile, the entrainment or catching bracket 1 is moved out of the range of action of the actuator element 7 including the ramp-like actuator face and falls down under the action of its own weight, however, engages the edge of the cut sheet metal strip or section beneath which the supporting rake means 5 has moved, by means of the upper bent hook-like end 3 of the entrainment bracket 1 and catches or entrains the cut sheet metal strip or section. Shortly prior to the abutment or stop means 5 arriving at the stacking location which is desired for the cut sheet metal strip there occurs a deceleration phase in which the supporting rake means 5 and the abutment or stop means 4 are decelerated such that the cut sheet metal strip or section executes a movement relative to the abutment or stop means 4 upon the supporting rake means 5 during which time the trailing edge of the cut sheet metal strip or section disengages from the upper bent hook-like end 3 of the entrainment or catching bracket 1. Under the action of its own weight the entrainment or catching bracket 1 now falls completely down against a suitable stop provided at the supporting rake means 5 and into its rest position as shown in FIG. 1. The abutment or stop means 4 remains at the predetermined location, while the supporting rake means 5 continues the rearward movement, again while being accelerated, until the same is completely retracted out of the region of the stacking location. Due to the abutment or stop means 4 which is stationary the cut sheet metal strip or section is retained, and thus, falls onto the intended stacking location upon the pallet 12. The roller platform 11 on which the pallet 12 for stacking the cut metal strips or sections is placed is vertically adjustable, as mentioned, by means of the four driven spindles; at the beginning of the cutting operation the roller platform 11 assumes its uppermost position. The increase in stacking height is compensated for by stepwisely lowering the roller platform 11. Consequently, the fall or drop height for the sheet metal sections or cuttings to be stacked is maintained approximately constant. When the pallet 12 is fully loaded and when the roller platform 11 is at the height of the parking roller track 20, then the pallet 12 is removed and replaced by another empty pallet or the like.

Instead of the design of the embodiment as described hereinbefore, the entrainment or catching bracket 1 mounted for rotation about an axis or pivot shaft 2 can be replaced, for example, by vertically displaceable entrainment or catching bolts containing a chamfer or bevelled portion for catching or entraining the cut sheet metal strips or sections on the supporting rake means 5. The catching bolts, also, are held in two positions, namely in a rest position below the receiving or support surface of the supporting rake means under the action of their own weight, and in an upward operative or working position into which the bolts are urged by a suitable actuating or camming surface of an actuator and in which the upper portion of the entrainment or catching bolts including the chamfer or bevelled portion projects from the upper edge of the supporting rake means to receive the trailing edge of the sheet metal sections or cuttings.

Instead of using the inherent weight of the entrainment or catching bracket or that of the entrainment or catching bolts for moving the entrainment means into their rest position, there also can be employed the force of a compression spring or a tension spring.

Instead of the horizontal rearward displacement of the common stacking frame 25 by about 200 mm required for the scrap metal cutting position as shown in FIG. 4, controllable sheet metal guides may be provided below the cutter or cutting blade 27 which conduct the obtained cuts of scrap metal, for example, during trimming the sheet metal plates, to a scrap metal container which has been introduced transversely beneath the sheet metal infeed or feeding table 9.

Another possibility to avoid the horizontal rearward movement of the common stacking frame 25 can be achieved by various arrangements of a scrap metal container of especially small height upon the pallet 12 in place of the first stack 13.1 of the sheet metal sections or cuttings, as such has been shown in FIG. 6, or upon the roller platform 11 immediately in front of the pallet 12 as has been shown in FIG. 7. In the embodiment shown in FIG. 6, however, the height of the scrap metal container 30 causes the fall or drop height during stacking of the lower-placed sheet metal sections or cuttings to increase, so that there will have to be tolerated the eventually formed less exact stacks thus obtained.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for outfeeding and stacking sheet metal sections or the like which are obtained following a sheet metal feeding table associated with a sheet metal shear arrangement, said apparatus comprising:
   cutting blade means defining a cutting plane;
   supporting rake means for receiving said sheet metal sections;
   abutment means;
   said abutment means being horizontally displaceable relative to said supporting rake means in accordance with a desired sheet metal section width;
   a roller platform;
   said roller platform being vertically adjustable and serving to carry pallets or containers for receiving stacks of said sheet metal sections;
   said supporting rake means, for stacking said sheet metal sections deposited thereon immediately after the cutting operation, being arranged together with said abutment means so as to be selectively positioned above one of a number of stacking locations during a first step of a substantially horizontal movement;
   said supporting rake means, for releasing the cut sheet metal section therefrom, being arranged to be displaced beyond said stacking location during a second step of said horizontal movement in the same direction;
   said supporting rake means being further arranged for vertical movement together with said cutting blade means;
   entrainment means provided at said supporting rake means at the side of said cutting blade means;
   said entrainment means comprising an entrainment finger pivotably mounted at said supporting rake means;
   actuator means arranged below the sheet metal feeding table and reciprocatable between an actuating position and a rest position;
   said actuator means in the actuating position thereof acting upon said entrainment finger in order to rotate the same into a entrainment position in which said entrainment finger projects beyond a predetermined surface of said supporting rake means when said supporting rake means is advanced towards the sheet metal feeding table;
   means for accelerating and decelerating said supporting rake means when executing said steps of movement in order to effect displacement of said sheet metal sections resting thereon; and
   scrap metal collecting means for collecting scrap metal cuttings formed during the cutting operation.

2. The apparatus as defined in claim 1, wherein:
   said entrainment finger of said entrainment means is structured to possess a substantially U-shape;
   said entrainment finger comprises a bent end;
   said sheet metal section having a trailing edge; and
   said bent end of said entrainment finger being engaged by said trailing edge in said entrainment position of said entrainment means, when said sheet metal section is displaced at the start of said first step of said horizontal movement and said bent end is released from said trailing edge when said sheet metal section is stopped in its movement.

3. The apparatus as defined in claim 1, wherein:
   said actuator means in said rest position thereof is positioned in front of said cutting plane and in said actuating position thereof is displaceable to the rear of said cutting plane into the region of said lowered supporting rake means.

4. The apparatus as defined in claim 1, wherein:
   said abutment means and said supporting rake means are mounted upon a common stacking frame;
   said common stacking frame being supported upon rollers; and
   said roller platform being displaceable substantially horizontally through a limited path of travel from a stacking position into a scrap metal cutting position.

5. The apparatus as defined in claim 4, wherein:

said common stacking frame includes a supporting structure arranged below said cutting blade means;
said supporting structure supporting said scrap metal collecting means; and
said scrap metal collecting means comprising a container arranged to be pushed into position transversely relative to the direction of said horizontal movement of said supporting rake means.

6. The apparatus as defined in claim 4, further including:
a stationary parking roller track;
a drive unit disposed between said common stacking frame and said parking roller track; and
said drive unit serving for moving said common stacking frame from the stacking position into the scrap metal cutting position.

7. The apparatus as defined in claim 1, wherein:
said scrap metal collecting means comprises a container positioned in place of a first sheet metal stack on said pallet.

8. The apparatus as defined in claim 1, wherein:
said scrap metal collecting means comprises a container positioned on said roller platform in front of the pallet receiving said sheet metal stacks; and
the height of said container is approximately equal to the height of said pallet.

* * * * *

UNITED STATES PATENT AND TRADEMARK OFFICE
CERTIFICATE OF CORRECTION

PATENT NO. : 4,474,094

DATED : October 2, 1984

INVENTOR(S) : EDUARD HÄNNI and WALTER GYGLI

It is certified that error appears in the above—identified patent and that said Letters Patent is hereby corrected as shown below:

Column 2, line 55, after "means" please delete ";" (semi-colon) and insert --.-- (period)

Column 3, line 56, please delete "a" (second occurrence)

Signed and Sealed this

Fifth Day of March 1985

[SEAL]

*Attest:*

DONALD J. QUIGG

*Attesting Officer*     *Acting Commissioner of Patents and Trademarks*